2,975,218
PRODUCTION OF DIALCOHOLS

Karl Büchner, Oberhausen-Sterkrade, and Otto Roelen, Oberhausen-Holten, Germany, assignors to Ruhrchemie Aktiengesellschaft, Oberhausen-Holten, Germany No Drawing. Filed Sept. 4, 1957, Ser. No. 681,905

Claims priority, application Germany Sept. 14, 1956

14 Claims. (Cl. 260—635)

This invention relates to new and useful improvements in the production of dialcohols and in particular in the production of dialcohols from methylal-carboxylic acids.

Methylal-carboxylic acids may be produced in accordance with the oxo synthesis by the catalytic addition of a carbon monoxide-hydrogen containing gas such as water gas to an unsaturated fatty acid. The methylal-carboxylic acids may be reduced with hydrogen in the presence of a hydrogenation catalyst to convert the methylal into the corresponding methylol group and thus form the corresponding methylol-carboxylic acids. The reduction of the methylal-carboxylic acids to form the methylol-carboxylic acids is generally effected at a pressure between about 20 and 100 kg./sq. cm. at hydrogenation temperatures which should not be in excess of about 135° C. when using precipitated nickel hydrogenation catalyst and not in excess of about 190° C. when using cobalt catalyst. When operating with these catalysts at higher temperatures generally a loss of the alcohols occurs due to demethyloxylation. The methylol-carboxylic acids may be further reduced to form diols. This further reduction is generally effected with oxide catalysts which may, for example, contain copper oxide and chromium oxide and which may additionally contain other metals such as barium or zinc. The oxide catalysts used for the further reduction of the methylol-carboxylic acids to the diols are, however, sensitive to water which may, for example, be admixed with the reactants or which, for example, is formed in the reaction. In order to maintain the activity of the catalyst by avoiding the presence of this water, it is preferable to convert the methylol-carboxylic acids into the corresponding methyl esters prior to the further reduction. This, however, requires an additional reaction step and the use of an additional alcohol as a reactant to form the esters.

One object of this invention is a process for the conversion of methylal-carboxylic acids into diols without the above mentioned disadvantages. This, and still further objects, will become apparent from the following description:

In accordance with the invention it has been found that methylal-carboxylic acids may be very economically converted into diols if the reduction of the methylal and carboxyl groups are effected in separate hydrogenation steps with the aldehyde groups first being converted to the alcohol groups by a hydrogenation under conditions at which the hydroxyl groups formed will immediately esterify with the carboxylic acid groups splitting off water, which is continuously removed, and thereafter the carboxyl groups being hydrogenated to form the diols without the danger of the formation of water which would interfere with the catalyst operation.

The starting methylal-carboxylic acids may be any of the known or conventional compounds having both aldehyde and carboxyl groups in the molecule. The starting methylal-carboxylic acids are preferably methylal-carboxylic acids obtained by the oxo synthesis catalytic addition of carbon monoxide and hydrogen to unsaturated fatty acids having 18 or 22 carbon atoms and one or several olefinic double bonds in their molecule, as for example, oleic acid, isooleic acid, linoleic acid, and linolenic acid, erucic acid or fatty acids obtained from train oil such as clupanodonic acid and similar acids. The invention therefore offers the opportunity of converting these acids into diols having an additional methyl group as compared with the starting acids, by a combination of the oxo synthesis with the process of the invention.

The hydrogenation in the first step in order to convert the aldehyde groups to alcohol groups with a simultaneous esterification of the alcohol groups formed with the carboxylic acid groups present should, in accordance with the invention be effected at a temperature which is higher than the conventional temperatures used for this hydrogenation. Thus, for example, temperatures of about 240° C. should be used when using cobalt catalysts which, for example, contain 100 parts by weight of cobalt and 50 parts by weight of kieselguhr and temperatures of about 210° C. should be used when using precipitated nickel catalyst, as for example, catalyst containing 100 parts by weight of nickel, and 50 parts by weight of kieselguhr.

When operating at these higher hydrogenation temperatures for effecting the first hydrogenation of the aldehyde to alcohol groups, an esterification of the alcohol groups which form with carboxylic acid groups present simultaneously occurs with the splitting off of water. The water thus formed is preferably continuously discharged with the tail gas.

The hydrogenation in all other respects is effected in the conventional manner using the conventional catalyst.

If a sufficient amount of alcohol is not formed in this first hydrogenation step to esterify all of the carboxylic acid groups present, as for example, when the starting product for the oxo synthesis contain larger amounts of saturated fatty acids it is then preferable to recycle a portion of the alcohols formed in the second hydrogenation step to the first hydrogenation step so that a complete esterification will occur and the possibility of the splitting off of water in the second hydrogenation step is avoided.

If, in contrast to the invention, the hydrogenation in the first step were effected at the conventional temperatures, as for example, temperatures of about 130° C. when using precipitated nickel catalyst which for example contain 100 parts by weight of nickel and 50 parts by weight of kieselguhr the reaction products formed after the absorption of hydrogen has ceased would still show considerable acid and carbonyl numbers. Even with frequent depressurization of the tail gas in order to attempt to remove water formed by partial esterification will not permit a complete conversion of the carbonyl groups into alcohol groups in the first hydrogenation step. Since under these conditions the complete esterification of the acid groups do not occur free acid groups will be present during the subsequent hydrogenation for the conversion of the carbonyl groups to the alcohol groups. With these free acid groups present the alcohols formed during this subsequent conversion will esterify with the free acid groups splitting off water which will interfere with the oxide hydrogenation catalyst used in this step as for example a copper oxide-chromium oxide catalyst prepared for example in accordance with the specification of Adkins. The deactivation of the oxide hydrogenation catalyst will prevent the same from splitting up the ester groups and reducing the same to dialcohols in an economically satisfactory time.

In contrast thereto, in accordance with the invention, the feed product formed in the first hydrogenation step can no longer supply water which will detrimentally affect the activity of the oxide catalyst in the second hydrogenation step.

While it is true that higher hydrogenation temperatures corresponding to temperatures used in accordance with the invention have been suggested in the hydrogenation of simple aldehydes and polyaldehydes obtained by the catalytic addition of water gas to mono or poly olefins in accordance with the oxo synthesis, this hydrogenation at the higher temperatures was always effected in the presence of a relatively large amount of water i.e., at least 5%. In accordance with the invention, a water free starting product is used and water is not formed until after the hydrogenation has occurred i.e., until after the alcohol has been formed and the same has had an opportunity to esterify with the acid group. It would normally be suspected that without the presence of water in the initial starting material and when operating at these higher temperatures, the aldehyde group would be completely reduced into the corresponding hydrocarbons. Similarly, it would normally be suspected that with the water being continuously discharged with the tail gas a complete hydrogenation to hydrocarbons would occur.

The hydrogenation product from the first hydrogenation step is then subjected to a further hydrogenation in a second hydrogenation step using the conventional oxide catalyst and under the conventional conditions which results in a smooth splitting of the ester group and at a reduction to form the desired diols. The hydrogenation in the second step is preferably effected at temperatures between about 280–300° C. at a pressure from about 300 kg./sq. cm.

In commercial operation in order to obtain greater gas economy, the tail gas from the second hydrogenation step may be used in the first hydrogenation step under a reduced pressure of about 200 kg./sq. cm. The tail gas from this first step, may, for example, be freed from water by cooling or with the use of a suitable desiccating agent, as for example, activated silica and may be recompressed up to a pressure of for example 300 kg./sq. cm. and recycled to the second hydrogenation step. If pure hydrogen is used for the hydrogenation, part of the tail gas must be withdrawn for the purpose of removing the inert gas admixtures.

As catalyst for the well known oxo synthesis step an aqueous cobalt salt solution may be employed containing 8–25 grams cobalt (as cobalt sulfate) to the liter, obtained by dissolving cobalt-carbonate in sulfuric acid up to a pH value of 3.5. However solid cobalt catalyst may also be used f.i. a catalyst containing 100 parts by weight of cobalt to 100 parts by weight of kieselguhr. The catalyst concentration in the reaction zone may be changed in wide limits.

The temperature ranges are limited to 155–180° C. At these temperatures 150 kg./sq. cm. may be given as lower pressure limit, 200–300 kg./sq. cm. as a preferred range. The reaction period corresponds to the affinity of the worked olefin for the oxo synthesis and amounts to ¾ up to f.i. 8 hours. Iron is always required, in case aqueous cobalt salt solution are employed necessitating the anion (acid rest) to be bonded by metal. Employing reduced cobalt precipitation catalyst addition of iron is not needed.

It is of advantage to work in such a way as to compensate the increase in volume in the reaction by the amount of water gas accepted, resulting in the reaction pressure remaining constant. The catalyst and likewise the diluting agent are first given into the reactor. Passing in water gas up to a pressure of 160–170 kg./sq. cm. at room temperature may be accomplished without delay.

The pre-treatment of the catalyst with water gas requires a period of 10–30 minutes at a temperature of 110–155° C. thereby forming cobalt carbonyl hydrogen essential for the addition of ($CO+H_2$) carbon monoxide and hydrogen. The proper conversion takes place between 155° and 180° C. employing cobalt salt solution and between 135–160° C. employing reduced catalysts. The pressure limits are 150–300 kg./sq. cm.

For the first stage hydrogenation according to the invention the customary catalysts may be employed. Nickel catalysts by precipitation are especially useful containing about 50 parts by weight of kieselguhr to 100 parts by weight of nickel. For preparation of this kind of catalysts an aqueous solution containing 100 g. nickel (in the way of nickel nitrate) to the liter is heated up to the boiling point. In this boiling solution a stoichiometric portion of a 2 normal sodium carbonate solution is poured under agitation. Following a minute agitation 50 grams kieselguhr is added again under agitation. Then the solution is separated from the residue employing a filter and the precipitate is washed out with hot water for such a time until the wash water does not show any more sodium nitrate. The moist scrubbed cake is drawn into worms by means of an extruding press and they are dried and reduced at 300° C. with a gas mixture containing 3 parts by volume of oxygen to one volume of nitrogen. Other metal catalysts containing 50 parts by weight of kieselguhr to 100 parts by weight of cobalt or other carrier material are prepared correspondingly.

Nickel catalysts are employed at 200–220° C. preferably at 210° C. Cobalt catalysts do work for the best in the temperature range of 230–250° C. preferably at 240° C. The gas pressures amount to 20–100 kg./sq. cm. The amount of catalyst is 10% by weight of the material to be hydrogenated. In case the catalysts are employed over again 2% by weight of fresh catalyst is added accordingly. For hydrogenation the purity of hydrogen is 90–99% showing the rest to be nitrogen.

The following examples are given by way of illustration and not limitation:

*Example 1*

A commercial-grade mixture of isomeric oleic acids having the characteristics:

| | |
|---|---|
| Iodine number | 90 |
| Neutralization number | 195 |
| Saponification number | 197 |
| Hydroxyl number | 5 |
| Carbonyl number | 16 |
| Density at 20° C. | 0.892 |
| Refractive index, $n_D^{20}$ | 1.4628 | was subjected to the catalytic addition of water gas, according to co-pending application Ser. No. 683,980 and to subsequent hydration to produce an aldehyde carboxylic acid having the following characteristics:

| | |
|---|---|
| Neutralization number | 143 |
| Saponification number | 185 |
| Carbonyl number | 158 |
| Hydroxyl number | 7 |
| Iodine number | 2 |

1.5 kg. of this aldehyde-carboxylic acid which had been completely dehydrated in a drying cabinet by blowing in nitrogen were placed into an autoclave with stirrer having a capacity of 3.6 liters, and, 150 cc. of a reduced cobalt-kieselguhr catalyst (100 Co, 50 kieselguhr) were added. The autoclave was pressurized with hydrogen under 100 kg./sq. cm. and the mixture was heated to 240° C. while stirring. After the beginning of the hydrogen absorption, 500 liters/hr. of hydrogen were continuously withdrawn from the autoclave and the consequent drop in pressure was continuously made up by adding fresh hydrogen. After 2 hours and after removal of the catalyst by filtration, the reaction product had the following characteristics:

| | |
|---|---|
| Neutralization number | 5.7 |
| Saponification number | 147 |
| Hydroxyl number | 37 |
| Carbonyl number | 2 |

1400 grams of this product and 140 grams of a commercial copper oxide-chromium oxide catalyst were placed into the same autoclave, which had previously been cleaned, and treated at 280° C. under a hydrogen pressure of 280 kg./sq. cm. The treatment was effected in such a manner that each time the pressure had dropped to 250 kg./sq. cm. it was made up to 280 kg./sq. cm. After 8 hours, a product having the following characteristics was obtained:

| | |
|---|---|
| Hydroxyl number | 310 |
| Neutralization number | 0.9 |
| Saponification number | 7.1 |
| Carbonyl number | 2 |
| Iodine number | 3 |

When, in contrast to this, the hydrogen in the first step was effected at 180° C. using the same cobalt catalyst and removing the water as before, the following characteristics were obtained after 1 hour:

| | |
|---|---|
| Neutralization number | 77 |
| Saponification number | 185 |
| Hydroxyl number | 34 |
| Carbonyl number | 48 |

After 6 hours, the following characteristics were reached:

| | |
|---|---|
| Neutralization number | 40 |
| Saponification number | 189 |
| Hydroxyl number | 0 |
| Carbonyl number | 46 |

If, after removal of the cobalt catalyst, this product was hydrogenated with the same copper-chromium oxide catalyst under the same conditions, only the following charasteristics were obtained after 8 hours:

| | |
|---|---|
| Neutralization number | 9.3 |
| Saponification number | 104 |
| Hydroxyl number | 150 |
| Carbonyl number | 6 |

When proceeding in this manner, only mixtures of di-alcohols and esters were obtained since the catalyst was not capable of completely converting the esters contained in the product into the dialcohols.

*Example 2*

A technical-grade mixture of unsaturated fatty acids had the following characteristics:

| | |
|---|---|
| Neutralization number | 191 |
| Saponification number | 191 |
| Hydroxyl number | 3 |
| Carbonyl number | 6 |
| Iodine number | 122 |

In addition to oleic acid and isooleic acids, this mixture contained unsaturated acids having several unsaturated carbon-carbon linkages, such as linoleic acids, linolenic acids, and probably also train oil fatty acids, such as clupanodonic acid. The mixture was converted into di-alcohols using the process described in Example 1. The reaction product obtained was a raw diol mixture having the following characteristics:

| | |
|---|---|
| Hydroxyl number | 314 |
| Neutralization number | 2 |
| Saponification number | 5 |
| Carbonyl number | 1 |
| Iodine number | 5 |

Here again, economical yields of diols could not be obtained from this mixture when operating by a method deviating from that provided by the invention.

We claim:

1. Process for the conversion of methylal-carboxylic acid into diols which comprises contacting a methylal-substituted mono-carboxylic fatty acid which has been obtained by subjecting an unsaturated fatty acid having from 18 to 22 carbon atoms in its molecule to the oxo synthesis and thereafter to a hydration treatment with water under pressure, with hydrogen in the presence of a nickel hydrogenation catalyst at a pressure between about 20 and 200 kg./sq. cm. at a temperature between about 200 and 220° C., removing the water which splits off and thereafter hydrogenating the ester formed in a second hydrogenation step by contacting with hydrogen at a temperature between about 280 and 300° C. and a pressure of about 300 kg./sq. cm. in the presence of a copper oxide, chromium oxide hydrogenation catalyst to thereby split the ester groups and form a diol.

2. Process according to claim 1 in which the water split off in said first hydrogenation step is continuously removed.

3. Process according to claim 1 in which a tail gas is recovered from said hydrogenation step, freed from water and recycled to said second hydrogenation step.

4. Process according to claim 1 in which a tail gas is recovered from said second hydrogenation step and recycled to said first hydrogenation step.

5. Process according to claim 1 which includes recycling an amount of diol formed in said second hydrogenation step to said first hydrogenation step sufficient for substantially complete esterification of the carboxylic acid group present in said methylal-carboxylic acid in said first hydrogenation step.

6. Process according to claim 1 in which said hydrogenation catalyst in said first hydrogenation step is a precipitated nickel-kieselguhl hydrogenation catalyst and in which said contacting with hydrogen in said first hydrogenation step is effected at a temperature of about 210° C.

7. Process according to claim 1 in which said contacting in said first hydrogenation step is effected at a pressure of about 200 kg./sq. cm. and in which the contacting in said second hydrogenation step is effected at a pressure of about 300 kg./sq. cm. and at a temperature of about 280–300° C.

8. Process for the conversion of methylal-carboxylic acid into diols which comprises contacting a methylal-substituted mono-carboxylic fatty acid which has been obtained by subjecting an unsaturated fatty acid having from 18 to 22 carbon atoms in its molecule to the oxo synthesis and thereafter to a hydration treatment with water under pressure, with hydrogen in the presence of a cobalt hydrogenation catalyst at a pressure between about 20 and 200 kg./sq. cm. at a temperature between about 230 and 250° C., removing the water which splits off and thereafter hydrogenating the ester formed in a second hydrogenation step by contacting with hydrogen at a temperature between about 280 and 300° C. and a pressure of about 300 kg./sq. cm. in the presence of a copper oxide, chromium oxide hydrogenation catalyst to thereby split the ester groups and form a diol.

9. Process according to claim 8 in which the water split off in said first hydrogenation step is continuously removed.

10. Process according to claim 8 in which a tail gas is recovered from said hydrogenation step, freed from water and recycled to said second hydrogenation step.

11. Process according to claim 8 in which a tail gas is recovered from said second hydrogenation step and recycled to said first hydrogenation step.

12. Process according to claim 8 which includes recycling an amount of diol formed in said second hydrogenation step to said first hydrogenation step sufficient for substantially complete esterification of the carboxylic acid group present in said methylal-carboxylic acid in said first hydrogenation step.

13. Process according to claim 8 in which said contacting in said first hydrogenation step is effected at a pressure of about 200 kg./sq. cm. and in which the contacting in said second hydrogenation step is effected at a pressure of about 300 kg./sq. cm. and at a temperature of about 280–300° C.

14. Process according to claim 8 in which said hydrogenation catalyst in said first hydrogenation step is a cobalt-kieselguhr catalyst and in which said contacting with hydrogen in said first hydrogenation step is effected at a temperature of about 240° C.

References Cited in the file of this patent

UNITED STATES PATENTS

| | | |
|---|---|---|
| 2,079,414 | Lazier | May 4, 1937 |
| 2,094,611 | Lazier | Oct. 5, 1937 |
| 2,452,092 | Ault et al. | Oct. 26, 1948 |
| 2,719,124 | Mikeska et al. | Sept. 27, 1955 |
| 2,802,843 | Tramm et al. | Aug. 13, 1957 |

OTHER REFERENCES

Lanning et al.: B.I.O.S. Final Rept. #748, Item #22 (P.B. 47720), September 1946, pages 7–12.

Grundmann: "Newer Methods of Preparative Organic Chemistry," Interscience, N.Y., 1948, pages 111–18, 104–6.